US011947373B2

(12) United States Patent
Lin et al.

(10) Patent No.: US 11,947,373 B2
(45) Date of Patent: Apr. 2, 2024

(54) ELECTRONIC DEVICE INCLUDING A LOW DROPOUT (LDO) REGULATOR

(71) Applicant: TAIWAN SEMICONDUCTOR MANUFACTURING COMPANY LTD., Hsinchu (TW)

(72) Inventors: Yu-Tso Lin, New Taipei (TW); Min-Shueh Yuan, Taipei (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 155 days.

(21) Appl. No.: 17/574,584

(22) Filed: Jan. 13, 2022

(65) Prior Publication Data

US 2023/0221743 A1 Jul. 13, 2023

(51) Int. Cl.
*G05F 1/575* (2006.01)
*G05F 1/56* (2006.01)

(52) U.S. Cl.
CPC .................................... *G05F 1/575* (2013.01)

(58) Field of Classification Search
CPC ................................... G05F 1/575; G05F 1/56
See application file for complete search history.

(56) References Cited

U.S. PATENT DOCUMENTS 5,504,447 A * 4/1996 Egging ................... G05F 3/247 327/566
5,552,697 A * 9/1996 Chan ....................... G05F 1/565 323/273
6,188,212 B1 * 2/2001 Larson ...................... G05F 1/56 323/281
6,522,114 B1 * 2/2003 Bakker .................. G05F 1/467 323/282
7,397,226 B1 * 7/2008 Mannama ............... G05F 1/575 327/558
10,866,607 B1 * 12/2020 Avci ........................ G01S 7/484
11,693,439 B2 * 7/2023 Chang ................. H03F 3/45475 323/280
11,705,895 B1 * 7/2023 Cheng .................. H03L 7/0995 331/57
2008/0067991 A1 * 3/2008 Lee ......................... G05F 1/575 323/273
2011/0012582 A1 * 1/2011 Aisu ....................... G05F 1/575 327/558
2013/0234684 A1 * 9/2013 Chang ..................... G05F 1/575 323/281

(Continued)

FOREIGN PATENT DOCUMENTS

CN 101136591 B * 8/2010 ............. G05F 1/575
CN 101815974 A * 8/2010 ............. G06F 1/571

(Continued)

*Primary Examiner* — Sisay G Tiku
(74) *Attorney, Agent, or Firm* — WPAT Law; Anthony King

(57) ABSTRACT

The present disclosure provide an electronic device. The electronic device includes a voltage generator and a low drop-out (LDO) circuit. The voltage generator has an input and an output. The LDO circuit has an input electrically connected to the output of the voltage generator. The voltage generator includes a first voltage regulator having a first terminal and a second terminal. The first terminal of the first voltage regulator is electrically connected to the output of the voltage generator.

19 Claims, 5 Drawing Sheets

(56) References Cited

U.S. PATENT DOCUMENTS

| | | | | |
|---|---|---|---|---|
| 2017/0097649 | A1* | 4/2017 | Lee | G05F 1/575 |
| 2017/0351284 | A1* | 12/2017 | Avci | G05F 1/575 |
| 2018/0120874 | A1* | 5/2018 | Chen | G05F 1/56 |
| 2019/0294189 | A1* | 9/2019 | Sakaguchi | G05F 1/565 |
| 2020/0125126 | A1* | 4/2020 | Gupta | G05F 1/59 |
| 2020/0278710 | A1* | 9/2020 | Sankman | G05F 1/575 |
| 2021/0373588 | A1* | 12/2021 | Wang | H03F 3/45273 |
| 2021/0397207 | A1* | 12/2021 | Joo | G05F 1/575 |
| 2022/0276666 | A1* | 9/2022 | Wu | G05F 3/262 |
| 2023/0063492 | A1* | 3/2023 | Tsao | G05F 3/262 |

FOREIGN PATENT DOCUMENTS

| | | | | | |
|---|---|---|---|---|---|
| CN | 106444949 | A | * | 2/2017 | G05F 1/561 |
| CN | 215219541 | U | * | 12/2021 | G05F 1/561 |
| CN | 114421897 | A | * | 4/2022 | |
| CN | 115509290 | A | * | 12/2022 | G06F 1/575 |
| TW | 202310546 | A | * | 3/2023 | G05F 1/461 |
| WO | WO-2020152283 | A1 | * | 7/2020 | B60R 21/017 |

* cited by examiner

ELECTRONIC DEVICE INCLUDING A LOW DROPOUT (LDO) REGULATOR

TECHNICAL FIELD

The disclosure relates to an electronic device, and, more particularly, to an electronic device including a low dropout (LDO) regulator.

BACKGROUND

LDO regulators are widely used for regulating output voltage. However, resistors at the output terminal of the LDO regulator may introduce noise, which may deteriorate performance of the LDO.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
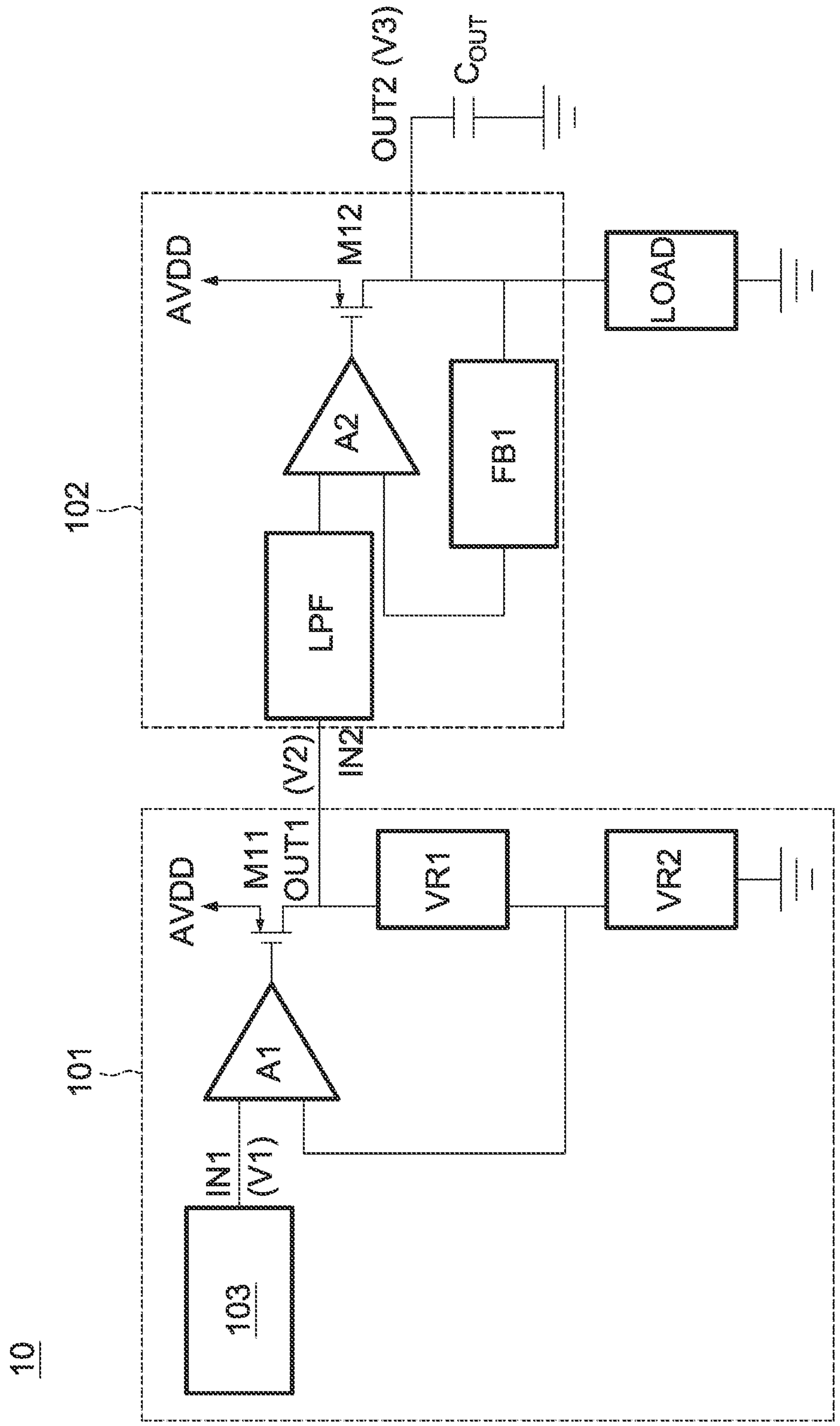
FIG. 1 is a schematic diagram of an electronic device in accordance with some embodiments of the present disclosure.

The following disclosure provides many different embodiments, or examples, for implementing different features of the provided subject matter. Specific examples of components and arrangements are as follows to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Embodiments, or examples, illustrated in the drawings are disclosed below using specific language. It will nevertheless be understood that the embodiments and examples are not intended to be limiting. Any alterations and modifications in the disclosed embodiments, and any further applications of the principles disclosed in this document are contemplated as would normally occur to one of ordinary skill in the pertinent art.

Further, it is understood that several processing steps and/or features of a device may be only briefly described. Also, additional processing steps and/or features can be added, and certain of the following processing steps and/or features can be removed or changed while still implementing the claims. Thus, the following description should be understood to represent examples only, and are not intended to suggest that one or more steps or features is required.

In addition, the present disclosure may repeat reference numerals and/or letters in the various examples. This repetition is for the purpose of simplicity and clarity and does not in itself dictate a relationship between the various embodiments and/or configurations discussed.

FIG. 1 is a schematic diagram of an electronic device 10 in accordance with some embodiments of the present disclosure. The electronic device 10 may be referred to as a LDO regulator. The electronic device 10 includes a voltage generator 101 and a low dropout (LDO) circuit 102.

The voltage generator 101 includes a voltage reference 103, an amplifier A1, a transistor M11, a voltage regulator VR1, and a voltage regulator VR2.

The voltage reference 103 has a terminal. The voltage reference 103 is configured to maintain a voltage within a predetermined range. The voltage reference 103 is configured to provide a desirable constant voltage. In some embodiments, the voltage reference 103 is configured to provide a constant voltage less than IV. The voltage reference 103 may include one or more transistors. The voltage reference 103 may include one or more Complementary Metal Oxide Semiconductor (CMOS) transistors.

The amplifier A1 has a first input terminal, a second input terminal, and an output terminal. The amplifier A1 may be a differential amplifier. The amplifier A1 is configured to amplify the difference between the voltages received by the first input terminal and the second input terminal and provide a voltage at the output terminal proportional thereto. In some embodiments, the amplifier A1 may be an operational transconductance amplifier (OTA). The amplifier A1 is configured to provide a current by multiplying the difference between the differential voltages with a transconductance (gm).

The transistor M11 has a gate, source, and drain. The transistor M11 may be a MOS field-effect transistor (FET). The transistor M11 may be a p-type MOSFET or a n-type MOSFET. The transistor M11 may be a power MOSFET.

The voltage regulator VR1 has a first terminal and a second terminal. The voltage regulator VR2 has a first terminal and a second terminal. Each of the voltage regulator VR1 and the voltage regulator VR2 may include one or more resistors or variable resistors.

As shown in FIG. 1, the first input terminal of the amplifier A1 is electrically connected to the terminal of the voltage reference 103. The second input terminal of the amplifier A1 is electrically connected to the second terminal of the voltage regulator VR1. The second input terminal of the amplifier A1 is electrically connected to the first terminal of the voltage regulator VR2. The output terminal of the amplifier A1 is electrically connected to the gate of the transistor M11. The source of the transistor M11 is electrically connected to a supply voltage AVDD. The drain of the transistor M11 is electrically connected to the first terminal of the voltage regulator VR1. The second terminal of the voltage regulator VR2 is electrically connected to ground.

The voltage generator 101 has an input IN1 electrically connected to the first input terminal of the amplifier A1. The voltage generator 101 has an output OUT1 electrically connected to the drain of the transistor M11. The output OUT1 of the voltage generator 101 is electrically connected to the first terminal of the voltage regulator VR1.

The input IN1 of the voltage generator 101 is configured to receive a voltage V1 from the voltage reference 103. The voltage generator 101 is configured to generate a voltage V2 at the output OUT1 thereof. The voltage V2 may be independent of the temperature variation. The voltage V2 is equal to the multiplication of the drain current and the impedance at the output OUT1 provided by the voltage regulator VR1 and the voltage regulator VR2. The drain current of the transistor M11 has a positive temperature coefficient (i.e., it increases with temperature). The current of the voltage regulator VR1 has a negative temperature coefficient (i.e., it decreases with temperature). Therefore, temperature-induced current variation is cancelled or reduced, and the voltage generator can provide a constant voltage (e.g., the voltage V2).

In some embodiments, the amplifier A1 may be designed as a high power supply rejection ratio (PSRR) OTA by increasing impedance at the output stage of the amplifier A1. As such, the amplifier flicker noise over a frequency spectrum from 10 Hz to 100M Hz can be reduced.

As shown in FIG. 1, the LDO circuit 102 includes a low-pass filter LPF, an amplifier A2, a transistor M12, and a feedback circuit FB1.

The low-pass filter LPF has a first terminal and a second terminal. The low-pass filter LPF is configured to filter high frequency noise.

The amplifier A2 has a first input terminal, a second input terminal, and an output terminal. The amplifier A2 may be a differential amplifier. The amplifier A2 is configured to amplify the difference between the voltages received by the first input terminal and the second input terminal and provide a voltage at the output terminal proportional to the difference therebetween. In some embodiments, the amplifier A2 may be an operational transconductance amplifier (OTA). The amplifier A2 is configured to provide a current by multiplying the difference between the differential voltages with a transconductance (gm).

The transistor M12 has a gate, source, and drain. The transistor M12 may be a p-type MOSFET or a n-type MOSFET. The transistor M12 may be a power MOSFET.

The feedback circuit FB1 has a first terminal electrically connected to the drain of the transistor M12. The feedback circuit FB1 has a second terminal electrically connected to the second input terminal of the amplifier A2.

As shown in FIG. 1, the first input terminal of the amplifier A2 is electrically connected to the second terminal of the low-pass filter LPF. The output terminal of the amplifier A1 is electrically connected to the gate of the transistor M12. The source of the transistor M12 is electrically connected to the supply voltage AVDD. The drain of the transistor M12 is electrically connected to an external system. The external system may be simplified as an impedance LOAD. The drain of the transistor M12 is electrically connected to an external capacitor $C_{OUT}$. The second terminal of the voltage regulator VR2 is electrically connected to ground.

The LDO circuit 102 has an input IN2 electrically connected to the first input terminal of the low-pass filter LPF. The low-pass filter LPF may be configured to filter a high frequency noise (e.g., from the voltage generator 101). In some embodiments, the input IN2 of the LDO circuit 102 may be electrically connected to the first input terminal of the amplifier A2. In other words, the LDO circuit 102 may exclude a low-pass filter.

The LDO circuit 102 has an output OUT2 electrically connected to the drain of the transistor M11. The output OUT2 of the LDO circuit 102 is electrically connected to the first terminal of the feedback circuit FB1. The output OUT2 of the LDO circuit 102 is electrically connected to the external capacitor $C_{OUT}$. The external capacitor $C_{OUT}$ may have a small capacitance. Therefore, the equivalent capacitance at the output OUT2 is relatively low. The output OUT2 of the LDO circuit 102 is electrically connected to the impedance LOAD. The output OUT2 of the LDO circuit 102 provides a voltage V3 to the external system (e.g., the impedance LOAD).

The feedback circuit FB1 may build a negative feedback loop for the LDO circuit 102. The LDO circuit 102 is configured to maintain the voltage V3 at the output OUT2. For example, when the voltage V3 at the second terminal of the feedback circuit FB1 (or at the output OUT2) increases, the difference between the first input terminal and the second input terminal of the amplifier A2 is reduced. The amplifier A2 generates a lower output voltage, which is in turn introduced to the gate of the transistor M12. Subsequently, the drain current is lower, as is the voltage V3 accordingly.

The output terminal of the amplifier A2 may generate a first pole in the frequency response for the LDO circuit 102. The output OUT2 may generate a second pole in the frequency response for the LDO circuit 102. The value of the second pole may exceed that of the first pole. The feedback circuit FB1 may generate a zero. The first pole generated by the amplifier A2 may be cancelled out by the zero generated by the feedback circuit FB1. As such, the LDO circuit 102 is more stable. Output noise (e.g., the thermal noise) at the output OUT2 is minimal.

In some embodiments, the amplifier A2 may be designed as a low-noise wide band OTA by adding a buffer at the output terminal of the amplifier A2 to have a lower dominant pole. As such, the band of the frequency response for the LDO circuit 102 may be wider.

Referring to FIG. 1, the input IN2 of the LDO circuit 102 is electrically connected to the output OUT1 of the voltage generator 101. The input IN2 of the LDO circuit 102 is configured to receive the voltage V2 from the voltage generator 101. The voltage V1 at the input IN1 exceeds the voltage V2 at the IN2. The ratio of the voltage V2 and the voltage V1 is based on impedance of the voltage regulator VR1 and the voltage regulator VR2. The voltage division is made in the voltage generator 101, and the output OUT2 of the LDO circuit 102 is directly connected to the external system (e.g., the impedance LOAD) and thereby provides an output voltage to the external system (e.g., the impedance LOAD). A resistor may be excluded at the output stage of the LDO circuit 102. As such, the electronic device 10 provides a constant output voltage (e.g., the voltage V3) with low output noise, and consequently has a high PSRR and low noise performance.

Figure 2:
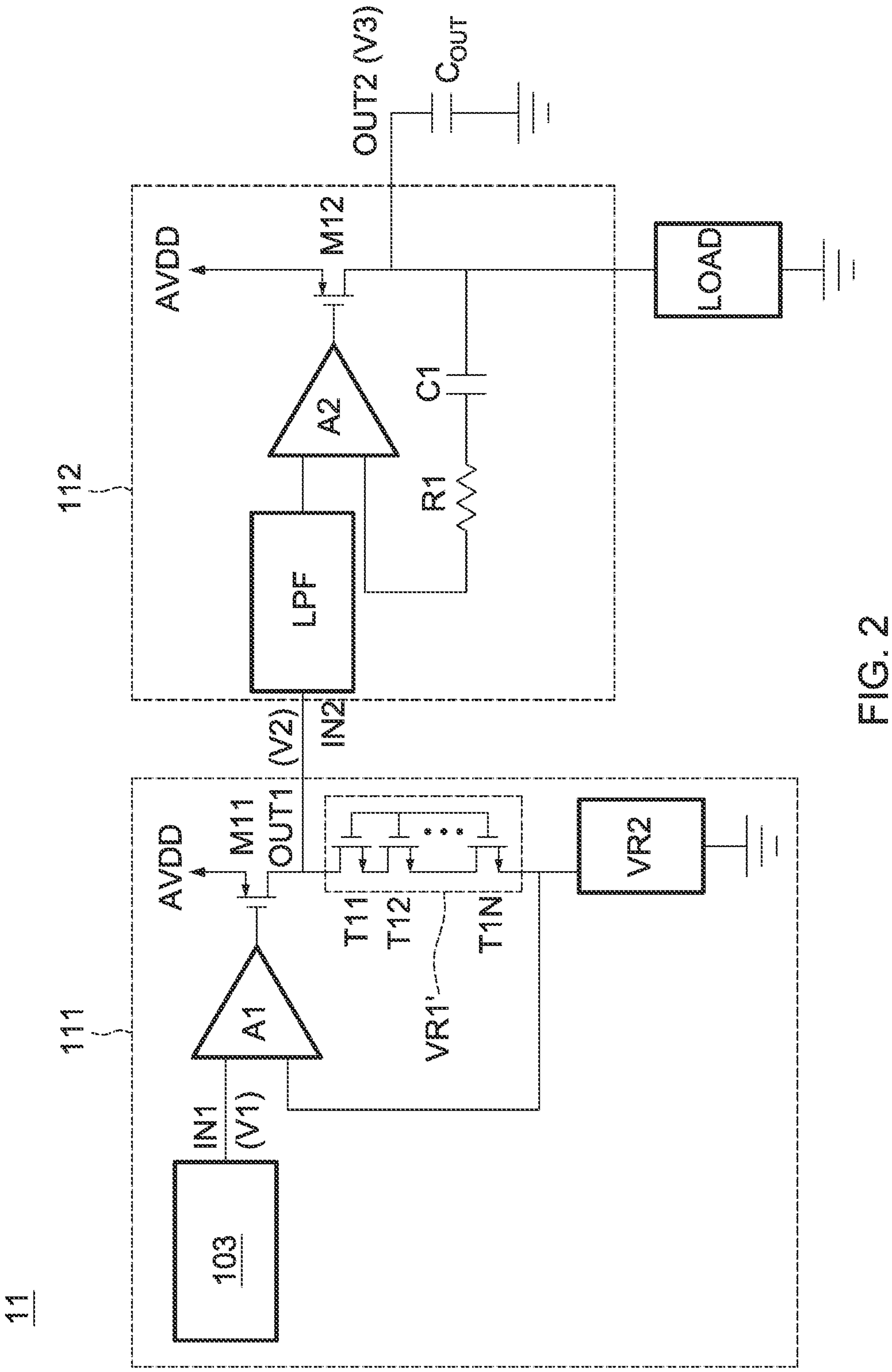
FIG. 2 is a schematic diagram of an electronic device in accordance with some embodiments of the present disclosure.

FIG. 2 is a schematic diagram of an electronic device 11 in accordance with some embodiments of the present disclosure. The electronic device 11 may be referred to as a LDO regulator. The electronic device 11 of FIG. 2 is similar to the electronic device 10 of FIG. 1, and some of the differences therebetween are as follows.

The electronic device 11 includes a voltage generator 111 and a LDO circuit 112. The voltage generator 111 includes the voltage reference 103, the amplifier A1, the transistor M11, and the voltage regulator VR2 of the voltage generator 101 of the electronic device 10, except that the voltage generator 111 includes a voltage regulator VR1'.

The voltage regulator VR1' includes a plurality of transistors T11, T12 . . . T1N, wherein N can be a positive integer. The transistors T11, T12 . . . T1N are stacked. The transistors T11, T12 . . . T1N each have a gate, source, and drain. The gates of the transistors T1, T12 . . . T1N are connected. The drain of the transistor T11 is electrically connected to the drain of the transistor M11. The drain of the transistor T11 is electrically connected to the output of the voltage generator 111. The source of the transistor T11 is electrically connected to the drain of the transistor T12. The source of the transistor T12 is electrically connected to the next transistor (e.g., T13, not shown in FIG. 2). The drain of the transistor T1N is electrically connected to the source of the previous transistor (e.g., T1N-1, not shown in FIG. 2). The source of the transistor T1N is electrically connected to the first terminal of the voltage regulator VR2. The source of the transistor T1N is electrically connected to the second input terminal of the amplifier A1.

The plurality of transistors T11, T12 . . . T1N may include short-channel transistors. The plurality of transistors T11, T12 . . . T1N may include transistors with minimum channel length. The plurality of transistors T11, T12 . . . T1N may function as a variable resistor. The current of the variable resistor formed by the plurality of transistors T11, T12 . . . T1N may have a negative temperature coefficient. When the temperature increases, the threshold voltages of the plurality of transistors T11, T12 . . . T1N increase accordingly, resulting in a lower current therethrough. As previously discussed, the drain current of the transistor M11 has a positive temperature coefficient. As such, by combining the two, temperature dependence can be cancelled or reduced. In some embodiments, the voltage generator 111 is independent of the temperature variation. In some embodiments, the number of plurality of transistors T11, T12 . . . T1N can be varied based on the extent that the voltage regulator VR1' needs to compensate the positive temperature effect of the transistor M11. In some embodiments, the threshold voltage of the plurality of transistors T11, T12 . . . T1N can be varied based on the extent that the voltage regulator VR1' needs to compensate the positive temperature effect of the transistor M11.

In some embodiments, the plurality of transistors T11, T12 . . . T1N may include FinFETs. Since FinFETs are not subject to the body effect, the number of FinFETs stacked together does not affect the threshold voltage of the FinFETs. The number of FinFETs can be determined based mainly on the extent the voltage regulator VR1' needs to compensate the positive temperature effect of the transistor M11.

In some embodiments, the voltage regulator VR2 may be similar to the voltage regulator VR1'. For example, the voltage regulator VR2 may include a plurality of transistors. The transistors of the voltage regulator VR2 may include short-channel transistors, or FinFETs. The plurality of transistors of the voltage regulator VR2 may function as a variable resistor.

In some embodiments, the equivalent resistance of the voltage regulator VR1' and the voltage regulator VR2 determines the value of the voltage V2 at the output OUT1 of the voltage generator 111.

The LDO circuit 112 includes the low-pass filter LPF, the amplifier A2, and the transistor M12 of LDO circuit 102 of the electronic device 10 of FIG. 1. The LDO circuit 112 further includes a resistor R1 and a capacitor C1. The resistor R1 has a first terminal electrically connected to the capacitor C1. The resistor R1 has a second terminal electrically connected to the second input of the amplifier A2. The first terminal of the resistor R1 is electrically connected to the drain of the transistor M12. The capacitor C1 has a first terminal electrically connected to the drain of the transistor M12. The first terminal of the capacitor C1 is electrically connected to the output OUT2. The capacitor C1 has a second terminal electrically connected to the first terminal of the resistor R1. The resistor R1 and the capacitor C1 connected in series generate a zero in the frequency response for the LDO circuit 112. The first pole generated by the amplifier A2 may be cancelled out by the zero generated by R1-C1 circuit. As such, the LDO circuit 112 is more stable. Output noise (e.g., the thermal noise) at the output OUT2 can be relatively low.

Figure 3:
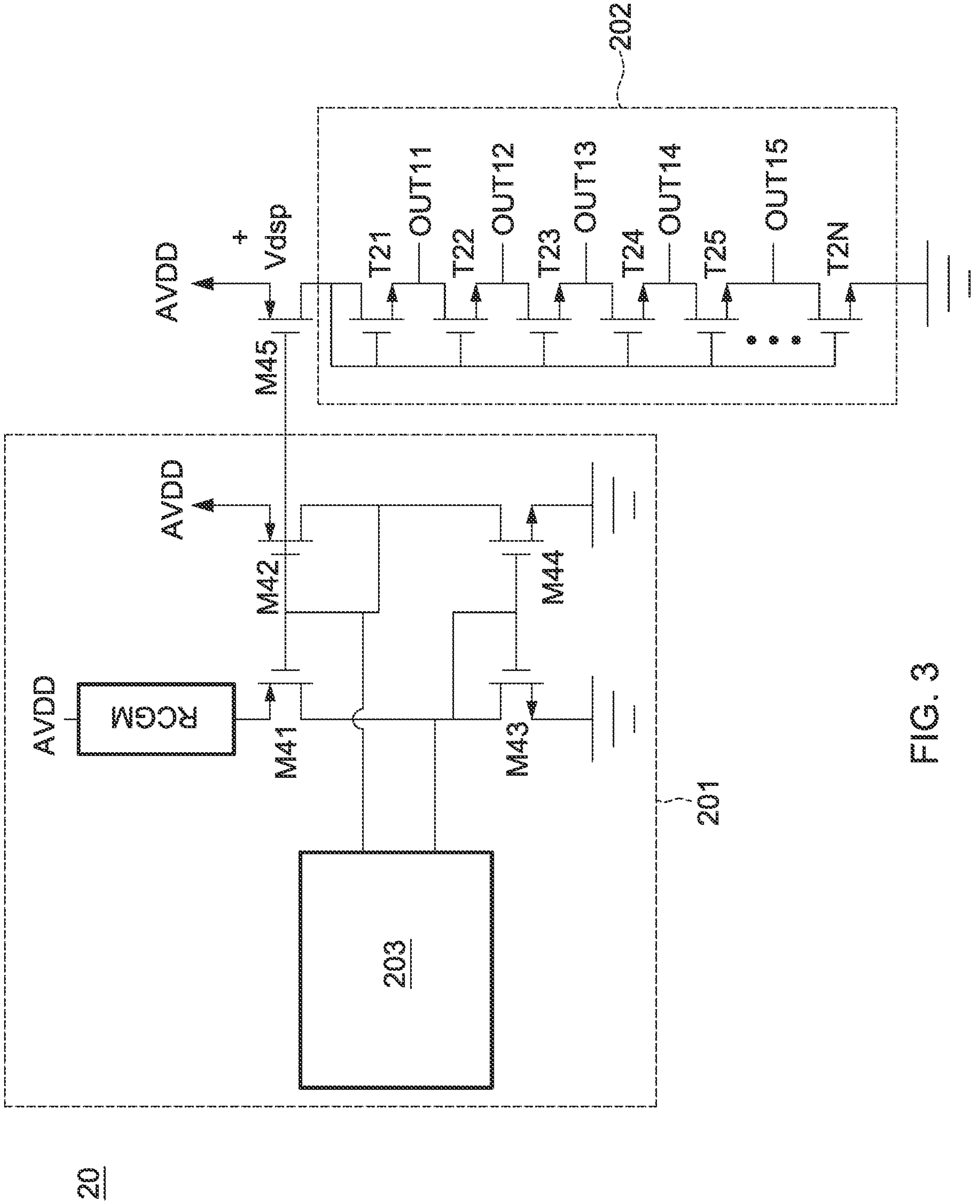
FIG. 3 is a schematic diagram of an electronic device in accordance with some embodiments of the present disclosure.

FIG. 3 is a schematic diagram of an electronic device 20 in accordance with some embodiments of the present disclosure. The electronic device 20 may be referred to as a voltage reference. The electronic device 20 includes a constant transconductance (gm) bias circuit 201, an output circuit 202, and a transistor M45.

The constant gm bias circuit 201 includes transistors M41, M42, M43, and M44, a start-up block 203, and a voltage reference RCGM. Each of the transistors M41, M42, M43, and M44 includes a gate, source, and drain. The transistors M41, M42, M43, and M44 may be a MOSFET. The transistor M41 or M42 may be a p-type MOSFET. The transistor M43 or M44 may be a n-type MOSFET.

The gate of the transistor M41 is electrically connected to the gate of the transistor M42. The gate of the transistor M41 is electrically connected to the drain of the transistor M42. The source of the transistor M41 is electrically connected to the supply voltage AVDD. The drain of the transistor M41 is electrically connected to the drain of the transistor M43. The source of the transistor M42 is electrically connected to the supply voltage AVDD. The drain of the transistor M42 is electrically connected to the date of the transistor M42. The drain of the transistor M42 is electrically connected to the drain of the transistor M44. The gate of the transistor M44 is electrically connected to the gate of the transistor M43. The gate of the transistor M44 is electrically connected to the drain of the transistor M43. The gate of the transistor M43 is electrically connected to the drain of the transistor M43. The source of the transistor M43 is electrically connected to ground. The source of the transistor M44 is electrically connected to ground.

The start-up block 203 has a first terminal and a second terminal. The first terminal of the start-up block 203 is electrically connected to the gate of the transistor M41. The first terminal of the start-up block 203 is electrically connected to the gate of the transistor M42. The first terminal of the start-up block 203 is electrically connected to the drain of the transistor M42. The second terminal of the start-up block 203 is electrically connected to the gate of the transistor M43. The second terminal of the start-up block 203 is electrically connected to the gate of the transistor M44. The second terminal of the start-up block 203 is electrically connected to the drain of the transistor M43. The start-up block 203 may be configured to power up the circuit 201. For example, the start-up block 203 may be configured to bring out a reference circuit from a zero current operating point to a normal operating point of the constant gm bias circuit 201.

The voltage reference RCGM is electrically connected to a supply voltage AVDD. The voltage reference RCGM is electrically connected to the source of the transistor M41.

The voltage reference is configured to provide a reference voltage to the constant gm bias circuit 201 (or the source of the transistor M41).

The gate of the transistor M45 is electrically connected to the gate of the transistor M41. The gate of the transistor M45 is electrically connected to the gate of the transistor M42. The gate of the transistor M45 is electrically connected to the first input of the start-up block 203. The source of the transistor M45 is electrically connected to the supply voltage AVDD. The drain of the transistor M45 is electrically connected to the output circuit 202.

The output circuit 202 includes a plurality of transistors T21, T22, T23, T24, T25 . . . T2N, wherein N is a positive integer. Each of the transistors T21, T22, T23. T24. T25 . . . T2N has a gate, source, and drain. The drain transistor T21 is electrically connected to the drain of the transistor M45. The drain of the transistor T21 is electrically connected to the gate of the transistor T21. The drain of the transistor T21 is electrically connected to the gate of the transistor T22. The drain of the transistor T21 is electrically connected to the gate of the transistor T23. The drain of the transistor T21 is electrically connected to the gate of the transistor T24. The drain of the transistor T21 is electrically connected to the gate of the transistor T25. The drain of the transistor T21 is electrically connected to the gate of the transistor T2N. The source of the transistor T21 is electrically connected to the drain of the transistor T22. The gates of the transistors T21, T22, T23, T24, T25 . . . T2N are electrically connected. The source of the transistor T22 is electrically connected to the drain of the transistor T23. The source of the transistor T23 is electrically connected to the drain of the transistor T24. The source of the transistor T24 is electrically connected to the drain of the transistor T25. The source of the transistor T25 is electrically connected to the drain of the next transistor (e.g., a transistor T26, not shown in FIG. 3). The drain of the transistor T2N is electrically connected to the source of the previous transistor (e.g., a transistor T2N-1, not shown in FIG. 3).

The output circuit 202 has a plurality of output terminals OUT11, OUT12, OUT13, OUT14, and OUT15. The output terminal OUT11 is electrically connected to the source of the transistor 21. The output terminal OUT12 is electrically connected to the source of the transistor 22. The output terminal OUT13 is electrically connected to the source of the transistor 23. The output terminal OUT14 is electrically connected to the source of the transistor 24. The output terminal OUT15 is electrically connected to the source of the transistor 25.

The plurality of transistors T21, T22, T23, T24, T25 . . . T2N may include short-channel transistors. The plurality of transistors T21, T22, T23, T24, T25 . . . T2N may include transistors with minimum channel length. In some embodiments, the plurality of transistors T21, T22. T23, T24, T25 . . . T2N may include FinFETs. Each of the plurality of transistors T21, T22, T23, T24, T25 . . . T2N may function as a resistor. The current of the plurality of transistors T21, T22, T23, T24, T25 . . . T2N may have a negative temperature coefficient. When the temperature increases, the threshold voltages of the plurality of transistors T21, T22, T23, T24, T25 . . . T2N increase accordingly, resulting in a lower current therethrough. On the other hand, the drain current of the transistor M45 has a positive temperature coefficient. As such, by combining the two, the temperature dependence can be cancelled or reduced. The multiple output terminals OUT11, OUT12, OUT13, OUT14, and OUT15 can be selected based on the extent that the output circuit 202 need to compensate the positive temperature effect caused by the transistor M45.

In some embodiments, the output circuit provide various voltages. The output voltage at the output terminals OUT11, OUT12, OUT13, OUT14, and OUT15 are different. One of the multiple output terminals OUT11, OUT12, OUT13, OUT14, and OUT15 can be connected to the next stage (e.g., the amplifier A1 of the voltage generator 101 of the electronic device 10 of FIG. 1) depending on the reference voltage required by the next stage.

Figure 4:
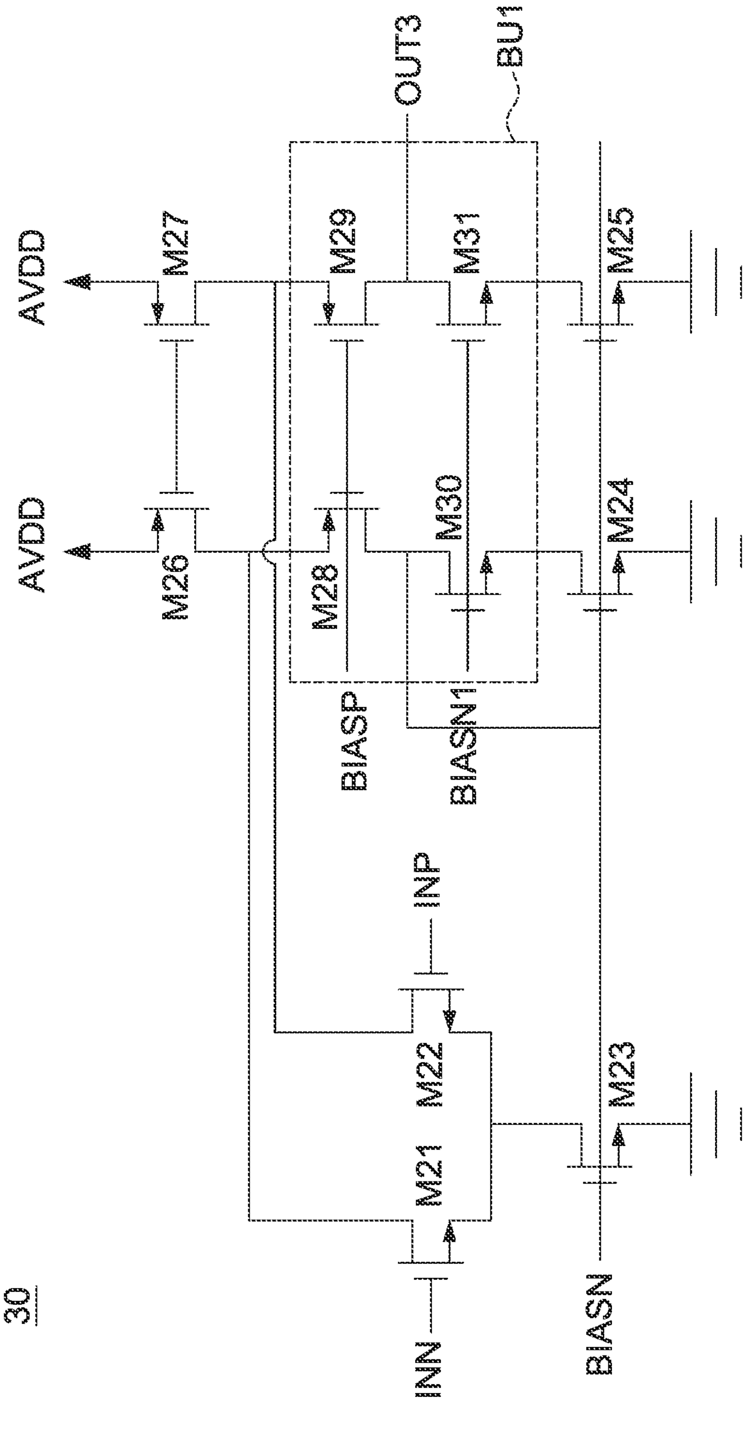
FIG. 4 is a schematic diagram of an electronic device in accordance with some embodiments of the present disclosure.

FIG. 4 is a schematic diagram of an electronic device 30 in accordance with some embodiments of the present disclosure. The electronic device 30 may be referred to as an OTA. FIG. 4 may be a detailed schematic diagram of the amplifier A2 (e.g., a low-noise wide band OTA).

The electronic device 30 includes transistors M21, M22, M23, M24, M25, M26, M27, and a current buffer BU1. The current buffer BU1 includes transistors M28, M29, M30, and M31. The transistors M21, M22, M23, M24, M25, M26, M27, M28, M29, M30, or M31 may be a MOSFET.

Each of the transistors M21, M22, M23, M24, M25, M26, M27, M28, M29, M30, and M31 has a gate, source, and drain. The gate of the transistor M21 may be configured to receive a first input signal INN. The gate of the transistor M22 may be configured to receive a second input signal INP. The source of the transistor M21 is electrically connected to the drain of the transistor M23. The source of the transistor M22 is electrically connected to the drain of the transistor M23. The gate of the transistor M23 may be configured to receive a first bias signal BIASN. The source of the transistor M23 is electrically connected to ground.

The drain of the transistor M21 is electrically connected to the drain of the transistor M26. The drain of the transistor M21 is electrically connected to the source of the transistor M28. The drain of the transistor M22 is electrically connected to the drain of the transistor M27. The drain of the transistor M22 is electrically connected to the source of the transistor M29. The source of the transistor M26 is electrically connected to a supply voltage AVDD. The source of the transistor M27 is electrically connected to the supply voltage AVDD. The drain of the transistor M26 is electrically connected to the source of the transistor M28. The drain of the transistor M27 is electrically connected to the source of the transistor M29. The gate of the transistor M28 may be configured to receive a second bias signal BIASP. The gate of the transistor M29 may be configured to receive the second bias signal BIASP. The drain of the transistor M28 is electrically connected to the drain of the transistor M30. The drain of the transistor M28 is electrically connected to the gate of the transistor M24. The drain of the transistor M28 may be configured to receive the first bias signal BIASN. The drain of the transistor M29 is electrically connected to the drain of the transistor M31. The gate of the transistor M30 may be configured to receive a third bias signal BIASN1. The gate of the transistor M31 may be configured to receive the third bias signal BIASN1. The source of the transistor M30 is electrically connected to the drain of the transistor M24. The source of the transistor M31 is electrically connected to the drain of the transistor M25. The gate of the transistor M24 may be configured to receive the first bias signal BIASN. The gate of the transistor M25 may be configured to receive the first bias signal BIASN. The source of the transistor M24 is electrically connected to ground. The source of the transistor M25 is electrically connected to ground.

The electronic device 30 has an output terminal OUT3. The current buffer BU1 is electrically connected to the output terminal OUT3. The current buffer BU1 at the output stage of the electronic device 30 (e.g., an OTA) generates a much lower dominant pole (e.g., lower parasitic capacitance and resistance) and therefore OTA gain bandwidth increases without extra pole/zero creation. Therefore, the electronic device 30 would have a wider band at the output terminal.

Figure 5:
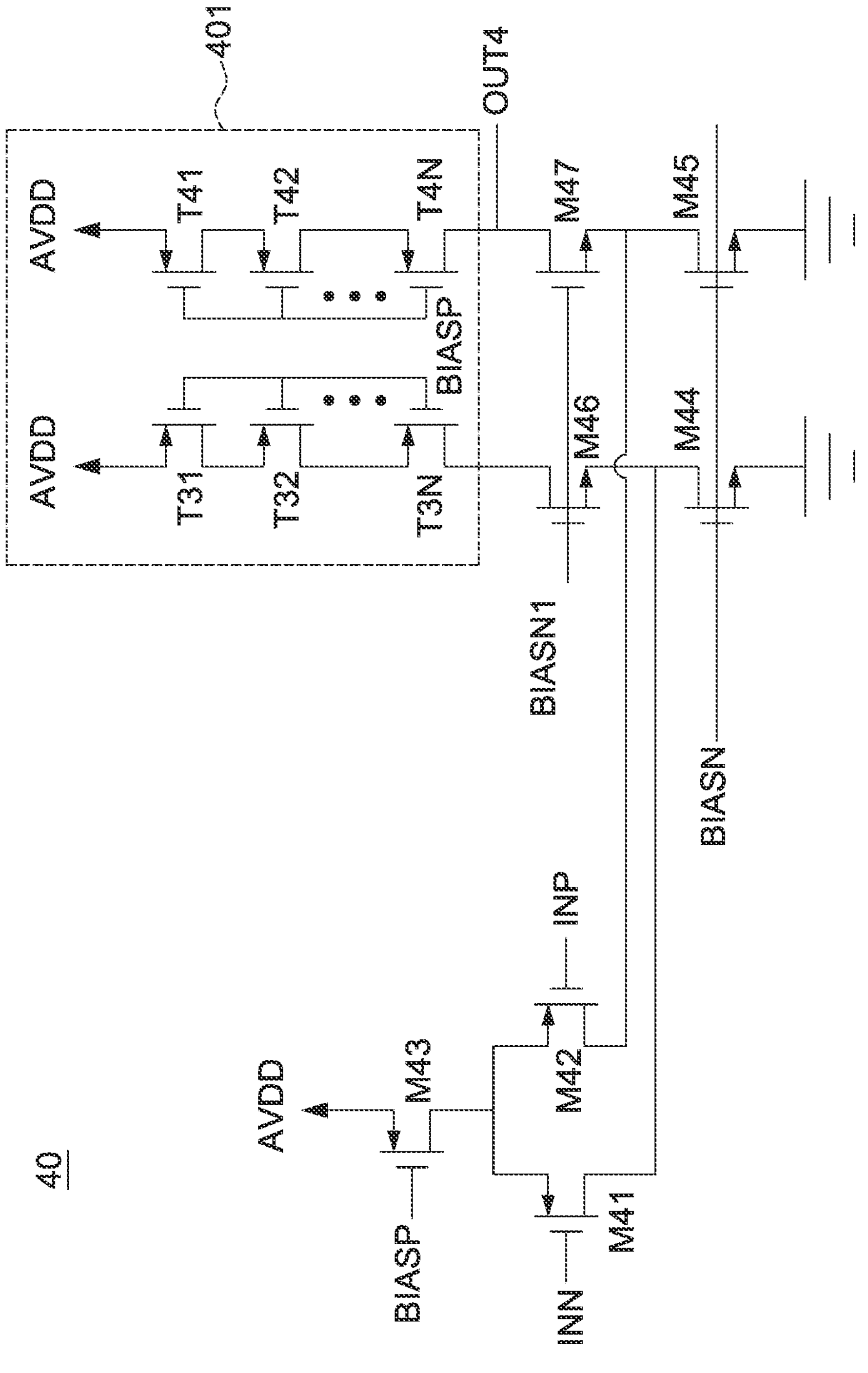
FIG. 5 is a schematic diagram of an electronic device in accordance with some embodiments of the present disclosure.

FIG. 5 is a schematic diagram of an electronic device 40 in accordance with some embodiments of the present disclosure. The electronic device 40 may be referred to as an OTA. FIG. 5 may be a detailed schematic diagram of the amplifier A1 (e.g., a high PSRR OTA).

The electronic device 40 includes transistors M41, M42, M43, M44, M45, M46, M47, and a cascode circuit 401. The transistors M41, M42, M43, M44, M45, M46, or M47 may be a MOSFET. Each of the transistors M41, M42, M43, M44, M45, M46, and M47 has a gate, source, and drain. The gate of the transistor M41 may be configured to receive a first input signal INN. The gate of the transistor M42 may be configured to receive a second input signal INP. The source of the transistor M41 is electrically connected to the drain of the transistor M43. The source of the transistor M42 is electrically connected to the drain of the transistor M43. The gate of the transistor M43 may be configured to receive a second bias signal BIASP. The source of the transistor M43 is electrically connected to a supply voltage AVDD.

The drain of the transistor M41 is electrically connected to the drain of the transistor M44. The drain of the transistor M41 is electrically connected to the source of the transistor M46. The drain of the transistor M42 is electrically connected to the drain of the transistor M45. The drain of the transistor M42 is electrically connected to the source of the transistor M47. The gate of the transistor M44 may be configured to receive a first bias signal BIASN. The gate of the transistor M45 may be configured to receive the first bias signal BIASN. The source of the transistor M44 is electrically connected to ground. The source of the transistor M45 is electrically connected to ground. The gate of the transistor M46 may be configured to receive a third bias signal BIASN1. The gate of the transistor M47 may be configured to receive the third bias signal BIASN1. The drain of the transistor M46 is electrically connected to the cascode circuit 401. The drain of the transistor M47 is electrically connected to the cascode circuit 401.

The cascode circuit 401 includes a first plurality of transistors T31, T32 . . . T3N, wherein N is a positive integer, and a second plurality of transistors T41, T42 . . . T4N, wherein N is a positive integer. The transistors T31, T32, . . . T3N each has a gate, source, and drain. The transistors T41, T42 . . . T4N each has a gate, source, and drain.

The source of the transistor T31 is electrically connected to the supply voltage AVDD. The drain of the transistor T31 is electrically connected to the source of the transistor T32. The drain of the transistor T32 is electrically connected to the source of the next transistor (e.g., a transistor T33, not shown in FIG. 5). The source of the transistor T3N is electrically connected to the drain of the previous transistor (e.g., a transistor T3N-1, not shown in FIG. 5). The gate of the transistors T31, T32 . . . T3N may be configured to receive the second bias signal BIASP.

The source of the transistor T41 is electrically connected to the supply voltage AVDD. The drain of the transistor T41 is electrically connected to the source of the transistor T42. The drain of the transistor T42 is electrically connected to the source of the next transistor (e.g., a transistor T43, not shown in FIG. 5). The source of the transistor T4N is electrically connected to the drain of the previous transistor (e.g., a transistor T4N-1, not shown in FIG. 5). The gate of the transistors T41, T42 . . . T4N may be configured to receive the second bias signal BIASP.

The electronic device 40 has an output terminal OUT4. The cascode circuit 401 increases the equivalent impedance at the output terminal OUT4. The PSRR of the electronic device 40 (e.g., an OTA) can be higher.

The present disclosure provides an electronic device. The electronic device includes a voltage generator and a low drop-out (LDO) circuit. The voltage generator has an input and an output. The LDO circuit has an input electrically connected to the output of the voltage generator. The voltage generator includes a first voltage regulator having a first terminal and a second terminal. The first terminal of the first voltage regulator is electrically connected to the output of the voltage generator.

The present disclosure provides a voltage reference. The voltage reference includes a transistor, an output circuit, and a constant transconductance bias circuit. The transistor has a gate, a source and a drain. The output circuit is electrically connected to the drain of the transistor. The constant transconductance bias circuit is electrically connected to the transistor. The output circuit is configured to provide various voltages.

The present disclosure provides a low dropout (LDO) circuit. The LDO circuit includes a transistor, a feedback circuit, and an operational transconductance amplifier (OTA). The transistor has a gate, a source and a drain. The feedback circuit is electrically connected to the drain of the transistor. The OTA is electrically connected to the gate of the transistor and the feedback circuit.

The methods and features of the present disclosure have been sufficiently described by examples and descriptions. It should be understood that any modifications or changes without departing from the spirit of the present disclosure are intended to be covered in the protection scope of the present disclosure.

Moreover, the scope of the present application in not intended to be limited to the particular embodiments of the process, machine, manufacture, and composition of matter, means, methods and steps described in the specification. As those skilled in the art will readily appreciate from the disclosure of the present disclosure, processes, machines, manufacture, composition of matter, means, methods or steps presently existing or later to be developed, that perform substantially the same function or achieve substantially the same result as the corresponding embodiments described herein may be utilized according to the present disclosure.

Accordingly, the appended claims are intended to include within their scope such as processes, machines, manufacture, compositions of matter, means, methods or steps. In addition, each claim constitutes a separate embodiment, and the combination of various claims and embodiments are within the scope of the present disclosure.

What is claimed is:

1. An electronic device, comprising:

a voltage generator having an input and an output; and a low drop-out (LDO) circuit having an input electrically connected to the output of the voltage generator, wherein the voltage generator includes a first voltage regulator having a first terminal and a second terminal, wherein the first terminal of the first voltage regulator is electrically connected to the output of the voltage generator, wherein the first voltage regulator includes a stack of a plurality of transistors.

2. The electronic device of claim 1, wherein the input of the voltage generator is configured to receive a first voltage and the input of the LDO circuit is configured to receive a second voltage from the output of the voltage generator, wherein the first voltage exceeds the second voltage.

3. The electronic device of claim 2, wherein the LDO circuit has a first output, and includes a transistor having a gate configured to receive a voltage signal associated with the second voltage, a source electrically connected to a supply voltage, and a drain electrically connected to the first output of the LDO circuit.

4. The electronic device of claim 3, wherein the drain of the transistor of the LDO circuit is directly connected to an external system.

5. The electronic device of claim 3, wherein the LDO circuit includes a feedback circuit electrically connected to the drain of the transistor of the LDO circuit.

6. The electronic device of claim 5, wherein the feedback circuit generates a zero for a frequency response of the LDO circuit.

7. The electronic device of claim 5, wherein the feedback circuit includes a resistor having a first terminal and a capacitor having a first terminal connected to the drain of the transistor of the LDO circuit and a second terminal connected to the first terminal of the resistor.

8. The electronic device of claim 5, wherein the LDO includes a second OTA having a first input terminal electrically connected to the input of the LDO circuit, a second input terminal electrically connected to the feedback circuit, and an output terminal electrically connected to the gate of the transistor of the LDO circuit.

9. The electronic device of claim 8, wherein the second OTA includes a current buffer electrically connected to the output terminal of the second OTA, such that the second OTA has lower dominant pole in a frequency response.

10. The electronic device of claim 1, wherein the plurality of transistors include short-channel transistors.

11. The electronic device of claim 1, wherein the voltage generator includes a second voltage regulator having a first terminal electrically connected to the second terminal of the first voltage regulator and a second terminal electrically connected to the ground.

12. The electronic device of claim 11, wherein the voltage generator includes a first operational transconductance amplifier (OTA) having a first input terminal electrically connected to the input of the voltage generator, a second input terminal electrically connected to the second terminal of the first voltage regulator, and an output terminal electrically connected to the output of the voltage generator.

13. The electronic device of claim 12, wherein the voltage generator includes a transistor having a gate electrically connected to the output terminal of the first OTA, a source electrically connected to a supply voltage, and a drain electrically connected to the first terminal of the first voltage regulator.

14. The electronic device of claim 1, wherein the LDO circuit includes a low-pass filter electrically connected to the input of the LDO circuit.

15. The electronic device of claim 1, wherein the plurality of transistors include FinFETs.

16. A voltage reference, comprising: a transistor having a gate, a source and a drain; an output circuit electrically connected to the drain of the transistor; and a constant transconductance bias circuit electrically connected to the transistor, wherein the output circuit is configured to provide various voltages, wherein the output circuit includes a stack of a plurality of short-channel transistors.

17. A low dropout (LDO) circuit, comprising:

a transistor having a gate, a source and a drain;

a feedback circuit electrically connected to the drain of the transistor; and an operational transconductance amplifier (OTA) electrically connected to the gate of the transistor and the feedback circuit, wherein the OTA includes a current buffer configured to reduce a dominant pole for a frequency response of the OTA.

18. The LDO circuit of claim 17, wherein the feedback circuit generates a zero for a frequency response of the LDO circuit.

19. The LDO circuit of claim 17, wherein the current buffer is electrically connected to an output terminal of the OTA.

* * * * *